US008229641B2

(12) United States Patent
Clothier

(10) Patent No.: US 8,229,641 B2
(45) Date of Patent: Jul. 24, 2012

(54) AIRCRAFT BRAKING CONTROL

(75) Inventor: Michael Clothier, Coventry (GB)

(73) Assignee: Meggitt Aerospace Limited (GB)

( * ) Notice: Subject to any disclaimer, the term of this patent is extended or adjusted under 35 U.S.C. 154(b) by 569 days.

(21) Appl. No.: 12/306,812

(22) PCT Filed: Jul. 5, 2007

(86) PCT No.: PCT/GB2007/002513
§ 371 (c)(1),
(2), (4) Date: Nov. 2, 2009

(87) PCT Pub. No.: WO2008/003971
PCT Pub. Date: Jan. 10, 2008

(65) Prior Publication Data
US 2010/0063703 A1    Mar. 11, 2010

(30) Foreign Application Priority Data
Jul. 5, 2006 (GB) .................................. 0613286.4

(51) Int. Cl.
*B60T 7/12* (2006.01)
*G05D 1/00* (2006.01)
*G06F 7/00* (2006.01)
*G06F 17/00* (2006.01)

(52) U.S. Cl. .................. 701/90; 701/3; 701/74; 701/78; 701/83; 701/91; 303/163; 180/197

(58) Field of Classification Search .......... 701/3, 70–92; 188/137, 138, 156, 158, 182; 340/451, 452, 340/453; 303/163, 164, 165, 113.1, 162; 180/197; 903/947; 356/600–601
See application file for complete search history.

(56) References Cited

U.S. PATENT DOCUMENTS

| 6,220,676 | B1 * | 4/2001 | Rudd, III | 303/150 |
| 7,286,909 | B2 * | 10/2007 | Darke | 701/3 |
| 2004/0140715 | A1 * | 7/2004 | Park et al. | 303/126 |
| 2007/0132311 | A1 * | 6/2007 | Giazotto | 303/126 |

FOREIGN PATENT DOCUMENTS

| GB | 2 292 195 | 2/1996 |
| WO | WO01/15948 A2 | 3/2001 |
| WO | WO2005/087563 | 9/2005 |

* cited by examiner

*Primary Examiner* — Thomas Tarcza
*Assistant Examiner* — Rami Khatib
(74) *Attorney, Agent, or Firm* — Renner, Kenner, Greive, Bobak, Taylor & Weber

(57) ABSTRACT

An aircraft braking control system for an aircraft braking system that comprises at least one first side braking unit (30L) for braking a respective wheel (22L) positioned on a first side of a longitudinal axis of an aircraft and at least one second side braking unit (30R) for braking a respective wheel (22R) positioned on a second side of said longitudinal axis, said braking control system comprising a brake control unit (40) operable to process respective measurements of performance of the braking units (30L, 30R) and according to the process results to provide command signals for controlling respective braking forces applied by said first and second braking units (30L, 30R) to reduce any difference between a first side braking force applied on the first side of the longitudinal axis by said at least one first side braking unit (30L) and a second side braking force applied on said second side by said at least one second side braking unit (30R).

29 Claims, 3 Drawing Sheets

AIRCRAFT BRAKING CONTROL

FIELD OF THE INVENTION

The invention relates to aircraft braking control and particularly, but not exclusively to aircraft braking control for unmanned air vehicles (UAVs).

BACKGROUND TO THE INVENTION

Conventionally, aircraft brakes are controlled by a pilot by way of left and right foot brake pedals that provide independent control of brakes on the left and right hand sides of the aircraft. Any variation in overall braking performance on each side of the aircraft would result in the aircraft veering to one side of the runway. However, the pilot is able to use the independent brake controls for the left and right hand sides of the aircraft to compensate for any such variation and keep the aircraft stable and straight down the runway.

For UAVs the brake control system needs to assume the role of the pilot in keeping the aircraft travelling in a straight line during braking. A simple controller actuating all brakes to achieve a desired level of aircraft deceleration would not take into account variations in the torque generated by the brake units on the left and right hand sides of the aircraft. Any variation in brake torque between the two sides of the aircraft will result in the aircraft veering to the side of the runway corresponding to the side with the greatest brake torque.

Systems exist for controlling the pressure applied to brakes in response to signals representative of the applied brake torque. However, such systems rely on costly sensors and the control is difficult given the variation in torque that is seen with the carbon-carbon friction materials that are used in modern aircraft brakes.

SUMMARY OF THE INVENTION

The invention includes apparatus for controlling an aircraft braking system that comprises at least one first side braking means for braking a wheel positioned on a first side of a longitudinal axis of an aircraft and at least one second side braking means for braking a wheel positioned on a second side of the longitudinal axis, said apparatus comprising control means for processing respective indications of braking effect of the braking means and in response to the result of said processing issuing control signals for controlling braking forces applied by the braking means, said indications of braking effect being determined based on wheel speed of the respective wheel and an aircraft speed value obtained without reference to wheel speed, each indication of braking effect comprising a brake slip ratio calculated using the equation:

$$\text{brake slip ratio} = \text{aircraft speed} - \text{wheel speed}/\text{aircraft speed}$$

said control signals being calculated to equalize said brake slip ratios, thereby to cause the braking force applied on said first side of the longitudinal axis by said at least one first side braking means to balance the braking force applied on the second side of the longitudinal axis by said at least one second side braking means.

The invention also includes a method of controlling brakes on an aircraft having at least one first side braking unit for braking a respective wheel positioned on a first side of a longitudinal axis of an aircraft and at least one second side braking unit for braking a respective wheel positioned on a second side of the longitudinal axis, said method comprising processing respective measurements of performance of the braking units which are calculated using a wheel rotational speed for the respective wheel and an indication of aircraft speed obtained without reference to the wheel speed, the respective measurements of performance are a slip ratio being calculated using the equation:

$$\text{brake slip ratio} = \text{aircraft speed} - \text{wheel speed}/\text{aircraft speed}$$

and, according to a processing output, issuing command signals for controlling the respective braking forces applied by the braking units calculated to equalize said brake slip ratios, thereby to obtain a force balance between the braking forces applied on the first side of the longitudinal axis by the at least one first side braking unit and the force applied on the second side of the longitudinal axis by the at least one second side braking unit.

It will be understood that the invention may be implemented by means of software or a data carrier loaded into an existing aircraft braking control system, or by substituting a chip or other system circuitry in an existing aircraft braking control system and so it is possible to upgrade existing braking control systems to provide the balancing functionality of the invention.

It will also be understood that the invention may be implemented by upgrading a control system that has a multi-system control function beyond control of an aircraft's brakes.

It will be appreciated that, although particularly applicable to UAVs, the invention may also be used in controlling the brakes of a manned aircraft during landings carried out under the control of an auto-brake system or directly controlled by the pilot.

It will also be understood that the invention provides for the balancing of the braking forces applied on each side of an aircraft's longitudinal axis to avoid, or at least reduce, any braking force imbalance that would cause the aircraft to veer in the direction of the side to which the higher braking force is applied.

In embodiments in which the invention is applied to the control of brakes of an aircraft having multiple wheels on each side, a force balance control between the two sides is provided and the control system may also control the force balance between the individual brakes of the brake sets on each side so that no one brake in a set is overloaded as compared with the other brakes in the set.

BRIEF DESCRIPTION OF THE DRAWINGS

The invention will be described in conjunction with the following drawings in which like reference numerals designate like elements and in order that the invention may be well understood, some embodiments thereof, which are given by way of example only, will now be described with reference to the drawings in which.

DETAILED DESCRIPTION OF THE EMBODIMENT

Figure 1:
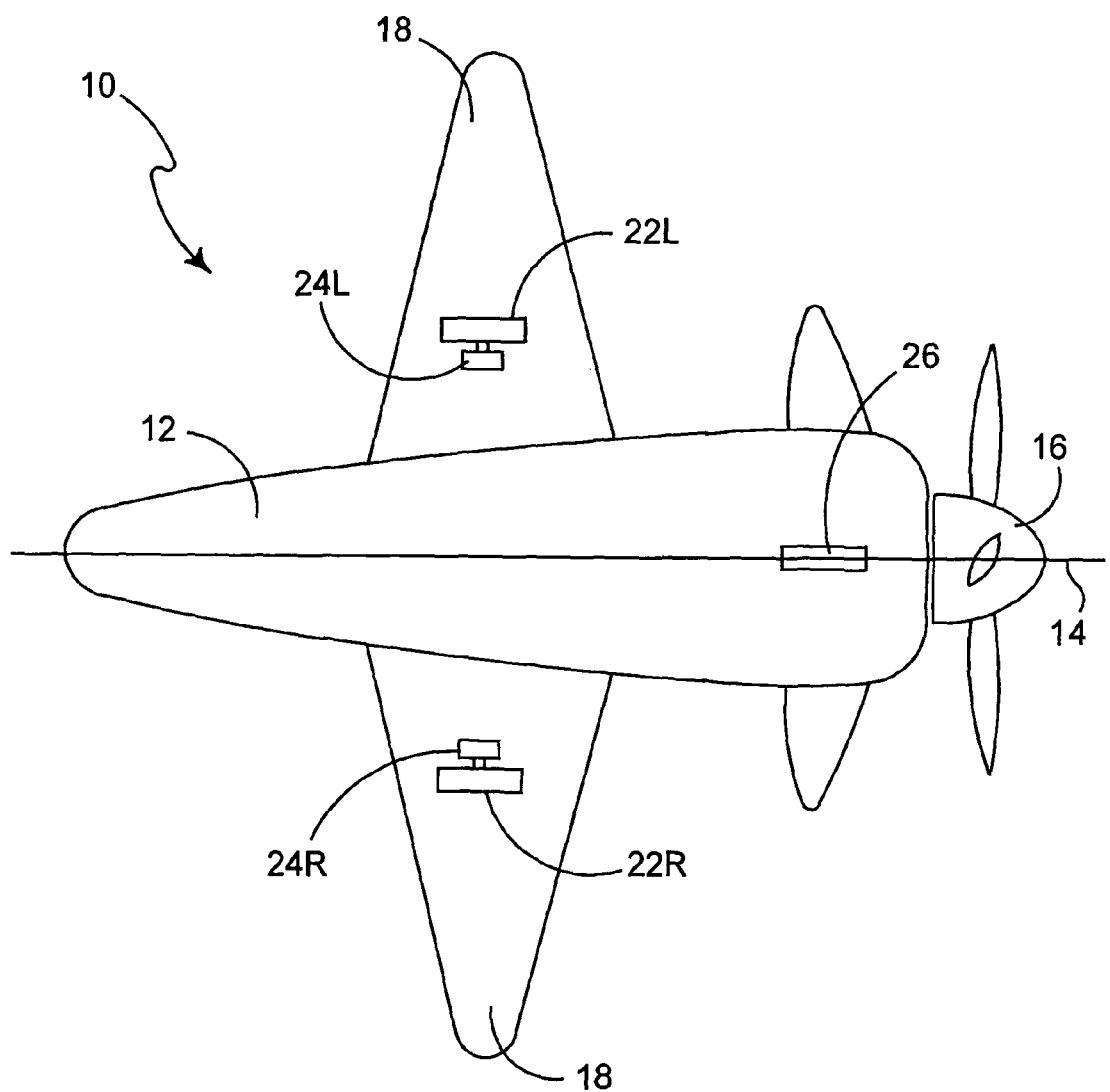
FIG. 1 shows the underside of an unmanned air vehicle (UAV)

Referring to FIG. 1 an unmanned air vehicle (UAV) 10 comprises a fuselage 12 having a longitudinal axis 14. A propeller unit 16 is mounted to the rear of the fuselage 12. A pair of wings 18 projects from the mid-section of the fuselage 12 and a pair of tail plane fins 20 is provided adjacent the rear end of the fuselage.

The wings 18 carry respective wheels 22L, 22R supported on legs 24L, 24R. A further wheel 26 is provided towards the rear of the fuselage 12. Each wheel 22L, 22R has an associated brake unit (not shown in FIG. 1) for braking the UAV 10 on landing and during ground manoeuvres. The wheel 26 is not braked.

Figure 2:
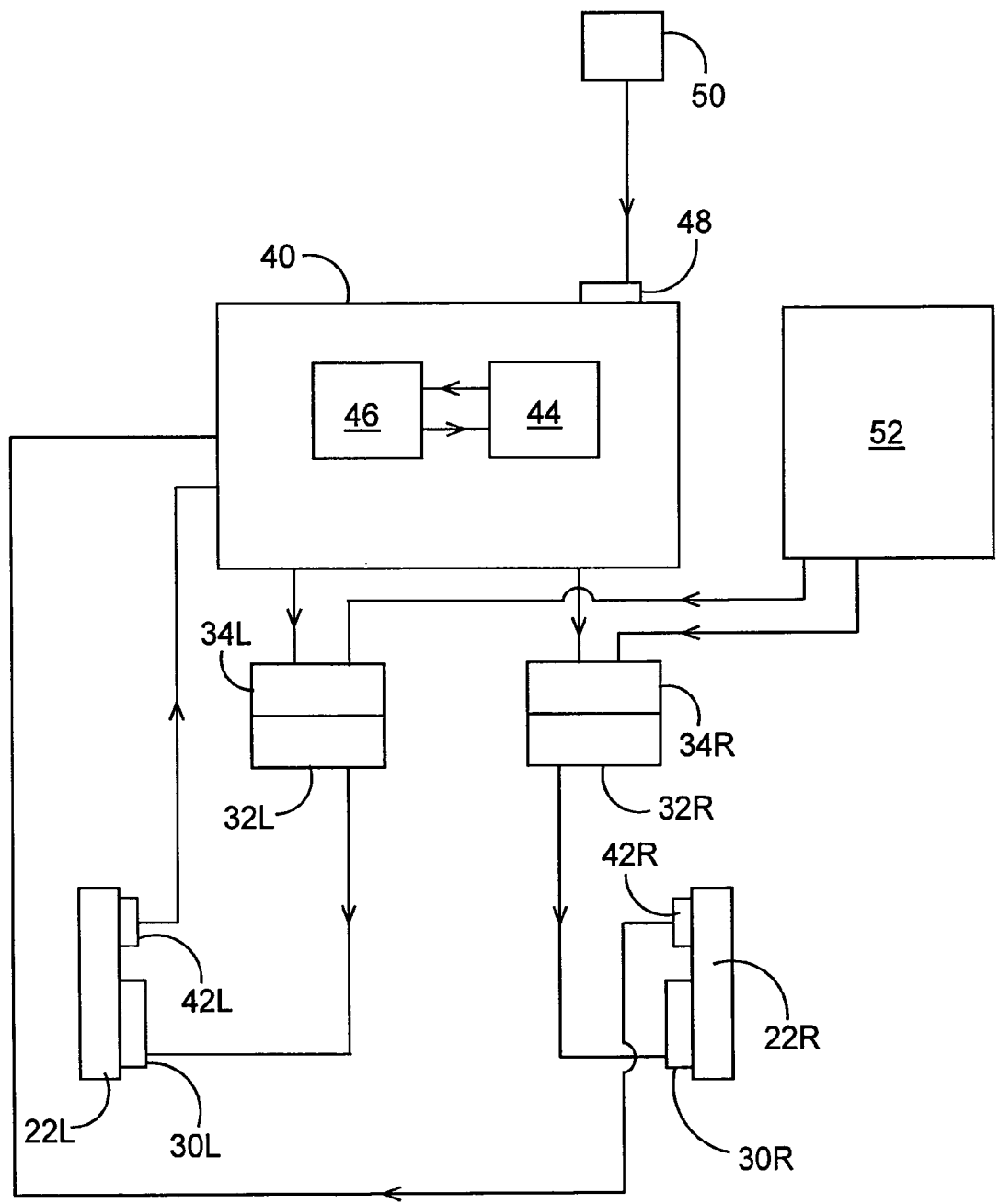
FIG. 2 is a diagrammatic representation of an aircraft braking control system and the brake system of the UAV shown in FIG. 1.

FIG. 2 shows the brake system of the UAV 10 in combination with an aircraft braking control system for controlling the brake system. The brake system comprises respective brake units 30L, 30R associated with the wheels 22L, 22R. The brake units 30L, 30R are preferably carbon-carbon units, but may be any type of brake suitable for use on an aircraft. The brake units 30L, 30R are actuated by respective brake actuators 32L, 32R under the control of respective brake controllers 34L, 34R. The brake actuators 32L, 32R may be of any conventional type. For example, the brake actuators 32L, 32R may comprise hydraulic pumps and valves for actuating the brake units 30L, 30R by means of controlled hydraulic pressure or electric servo motors for actuating the brake units 30L, 30R electrically. Actuators for aircraft brakes will be familiar to those skilled in the art and, therefore, will not be described in further detail herein.

The aircraft brake system is controlled by means of an aircraft braking control system comprising a brake control unit 40 and respective wheel speed sensors 42L, 42R. The wheel speed sensors 42L, 42R provide signals indicative of the speed of rotation of the wheels 22L, 22R. The signals from the wheel speed sensors 42L, 42R are fed to the brake control unit 40. The brake control unit 40 may include any signal conditioning devices necessary to put the signals from the wheel speed sensors 42L, 42R into a condition that allows the signals to be processed by a processor 44 that is a part of the brake control unit 40. For example, the brake control unit 40 may include analogue to digital (A/D) converters, amplification means and/or filtering means for conditioning the signals from the sensors. The wheel speed sensors 42L, 42R may be any suitable sensor, known in the art.

The brake control unit 40 also comprises a memory unit 46 comprising random access memory (RAM) and read only memory (ROM). The ROM is used to store a program for operating the aircraft braking control system and any look-up data that might be used by the operating program.

The brake control unit 40 has an input port 48 for receiving an independently generated aircraft speed data signal from a speed data source 50. The signal will normally be an inertial reference signal (IRS). However, the aircraft speed data may be provided by other systems used alone, or in combination with the IRS. One such system is the Global Positioning System (GPS).

The aircraft braking control system also comprises an auto-brake system 52 that in this embodiment is a separate unit. It will be understood that the braking control unit 40 may be a stand alone unit operating in conjunction with a separate auto-brake system 52 as shown, or may be integrated into a single unit that provides auto-brake functionality. Similarly, the aircraft braking control system may comprise an anti-skid control system provided as a separate unit or integral with the brake control unit 40 and/or an auto-brake system unit. Auto-brake and anti-skid control systems will be familiar to those skilled in the art and so will not be described in further detail herein.

In use, the brake control unit 40 receives the speed data signal from the speed data source 50. When the UAV 10 is on the ground and rolling, respective wheel speed signals indicative of the rotational speed of the wheels 22L, 22R are transmitted to the brake control unit 40 by the wheel speed sensors 42L, 42R.

The processor 44 processes the received wheel speed signals to calculate an individual radius for each wheel 30L, 30R. The wheel radius is calculated by dividing the aircraft speed (as indicated by the aircraft data speed signal) by the wheel speed. The wheel speed is in radians/second (rads/s) and the aircraft speed will be in metres/second (m/s) or knots and the result of the division is a calculated radius for the wheel for a single instant in time. It will be appreciated that the brake control unit 40 may include conditioning circuitry for scaling the respective signals to make them compatible for the division process, or the processor may apply a scaling routine as a part of the division process.

It is preferred that the wheel radii are recalculated continuously while the aircraft is rolling by using a rolling average technique that comprises performing a simple calculation every software loop, for example, as follows:

i) the aircraft speed is divided by the wheel speed and the result is stored;
ii) the stored value is placed in an 8-bit register and moved to the right each software loop;
iii) the contents of the register are summed and the result divided by 8 to provide an average wheel radius.

This process effectively generates an independent calculated radius for each wheel 30L, 30R in a continuous process using a rolling average technique.

At the point of "Brakes On" instigated by the auto-brake system 52, the calculated radius for each wheel is frozen and the auto-brake system 52 issues commands to the brake controllers 34L, 34R to cause them to apply an equal brake force to each side of the UAV 10. The auto-brake system 52 adjusts the total applied brake force to achieve the selected deceleration rate.

The "frozen wheel radius" is used by the processor 44 to calculate a measurement of performance (braking effect value) for each brake unit 30L, 30R in the form of a slip ratio for each wheel 22L, 22R. The slip ratio is determined using the equation:

$$\text{Slip Ratio} = \frac{\text{aircraft speed} - \text{wheel speed}}{\text{aircraft speed}}$$

where the wheel speed is the product of rotational wheel speed and the frozen wheel radius (ie the rotational wheel speed as represented by signals from the wheel speed sensor is multiplied by the frozen wheel radius).

During the braking run, the instantaneous slip ratio for each wheel 22L, 22R is repeatedly calculated by the processor 44 using a repeating software loop. The processor 44 compares the calculated slip ratios for the wheels 22L, 22R to determine what difference there is between them. The processor 44 sends command signals to the brake controllers 34L, 34R to reduce or increase the effective braking force applied by the brake units 32L, 32R according to the difference between the respective slip ratios. The command signals cause a change in the braking force applied to the brake units 30L, 30R that is calculated to drive the slip ratios towards an average of the last two calculated values. The brake control unit 40, therefore, continuously adjusts the gain of the brake controllers 34L, 34R to try and achieve equality of the slip ratios for the two brake units 30L, 30R. By doing this, the braking force acting on each side of the UAV 10 is equalised to keep the UAV running in a straight line during braking.

It will be appreciated that using the slip ratio equation gives a figure that is independent of the actual speed of the UAV and so makes brake force balancing easier to perform. If wheel speed balancing was employed rather than slip balancing then the difference signal would be in knots or m/s, which would be much more difficult to control. This is because a variable gain based on actual UAV speed would need to be used to vary the proportional integral and differential gain as the aircraft speed reduced under braking. This difficulty can be illustrated by considering an example of a decelerating UAV. At 100 knots UAV speed, a variation between the wheels of 2 knots would equate to a slip ratio variation of 2%. However, when the UAV has decelerated to 10 knots, a 2 knots wheel variation would equate to a slip ratio of 20%.

For safe operation of the UAV 10 during landing, high speed taxi braking and during a rejected-take-off, it is essential to equalise the slip ratio for each wheel 22L, 22R during braking to keep the UAV in a straight line. It will be appreciated that the aircraft braking control system allows the safe operation of brakes on UAVs, by providing even braking on the left and right hand sides of the UAV even when there is a variation in the friction coefficient generated by the friction material on the two sides.

It will be understood that at times during low speed taxi work, it might be necessary to use the brakes to turn the UAV. When the brakes are being used to turn the UAV the slip ratio can be adjusted to slow the wheel on the side around which the aircraft is going to be turned more than the wheel on the other side.

Figure 3:
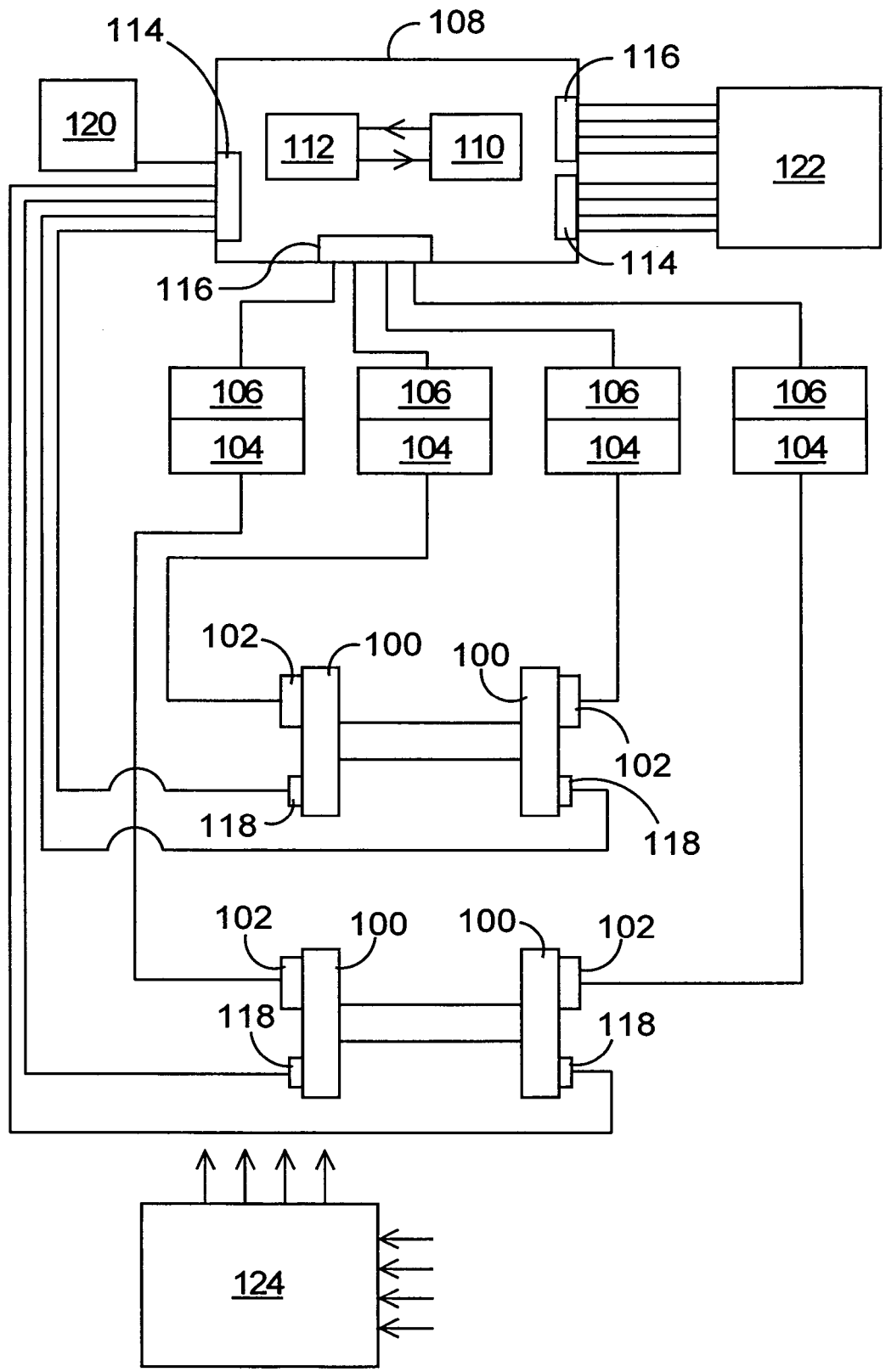
FIG. 3 is a diagrammatic representation of an aircraft braking control system and brake system for an aircraft having multiple braked wheels on each side of the longitudinal axis of the aircraft.

The aircraft brake system shown in FIG. 2 is for a UAV that has only one wheel 22L, 22R on each leg 24L, 24R. FIG. 3 illustrates an aircraft brake system and aircraft braking control system operating on similar principles, but for an aircraft that has more than one wheel on each leg.

FIG. 3 shows an aircraft braking control system and an aircraft brake system for an aircraft that has four wheels 100 supported from a leg (not shown) that is attached to the left hand side wing of an aircraft (not shown). The brake system comprises an individual brake unit 102 for each wheel 100 with respective actuators 104 for applying a brake force to the brake units and respective brake controllers 106 for the actuators.

The aircraft braking control system comprises a brake control unit 108 that includes a processor 110, memory unit (RAM and ROM) 112, input port module 114, output port module 116 and respective wheel speed sensors 118 for sensing the individual speeds of the wheels 100. The wheel speed sensors 118 are connected to the input port module 114 for transmitting signals indicative of rotational wheel speed to the brake control unit 108 for processing by the processor 110. The brake control unit 108 may also include any suitable signal conditioning equipment required to condition the signals to make them suitable for processing by the processor 110. The brake controllers 106 are connected to the output port module 116 for receiving command signals from the brake control unit 108.

The brake control unit 108 may be a standalone unit that operates in conjunction with other braking control system elements, such as an auto-brake system and/or an anti-skid system or may be integrated into a single unit that provides auto-brake and/or anti-skid functionality.

A data source 120 for supplying data signals indicative of aircraft speed is connected to the input port module 114. The data signals may be IRS or GPS signals or a combination of both, or any other suitable signal representing the aircraft speed independently of the wheel speed.

For ease of representation, FIG. 3 shows the brake control unit 108 in combination with the equipment associated with the left hand wheels 100 of an aircraft. It will be appreciated that although not shown in detail, there is a corresponding set of equipment 122 for the wheels of the right hand side of the aircraft. The equipment on the right hand side is connected to the input port module 114 and output port module 116 of the brake control unit 108 and operated in the same way as the equipment on the left hand side.

In use, the auto-brake system 124 is set to either the minimum or medium deceleration rate (selecting the maximum rate will invariably induce anti-skid correction activity that will override the balancing operation). The brake control unit 108 operates to determine a wheel radius for each wheel 100 on both sides of the aircraft using the rolling average technique in the same way as the brake control unit 40. At the "Brakes On" point, commands are issued to the brake controllers 106 on each side of the aircraft to apply an equal brake force to each side of the aircraft. The auto-brake system 124 adjusts the total applied brake force to achieve the selected deceleration rate.

From the moment the brakes go on, the brake control unit 108 determines a braking effect value in the form of a slip ratio for each wheel 100 in the same way as the brake control unit 40. Thus for each side of the aircraft, four slip ratios are calculated. The ratios for each side are summed and divided by four to produce an average slip ratio for each side of the aircraft. The two average slip ratios are then summed and divided by two to produce a target slip ratio. This target slip ratio is the value required to decelerate the aircraft at the required rate. The brake control unit 108 issues commands to the brake controllers 106 on each side of the aircraft to increase the braking force on one leg and reduce the braking force on the other leg to drive the respective average slip ratios towards the target ratio. This ensures that the aircraft achieves the required deceleration rate whilst maintaining straight line movement. The individual slip ratios for each wheel 100 on a leg are then processed in a similar way to produce command signals that adjust the braking force on each wheel to maintain the average for the four while balancing the energy distribution between the brake units 102 equally. The brake control unit 108 thus uses the slip ratio balancing technique to first equalise the braking force across the longitudinal axis of the aircraft using the average slip ratios for the two wheel sets and then balances the braking force applied by the individual brake units 102 of each wheel set so that the braking load is evenly distributed amongst the brake units. Thus, for example, at the end of one software loop, the brake control unit 108 may issue commands that cause the brake force applied by one brake unit 102 to be reduced while the forces applied by the other three brake units 102 on the leg are variously increased to obtain the required average force.

It will be appreciated that the facility to balance the braking load taken by the individual brake units 102 is advantageous in terms of improving overall brake unit life by equalising brake wear and reducing the likelihood of brake unit failures. This is likely to be especially valuable for brake systems that comprise brake units that have carbon-carbon friction surfaces. This is because carbon-carbon units tend to provide more uneven braking forces than steel brakes. This can be understood by reference to an extreme example in which on each side of the aircraft, one carbon-carbon brake unit of a set of four provides sufficient braking force to achieve the required deceleration rate. This results in that one unit absorbing a huge amount of kinetic energy, which by design should be shared equally between the four brake units. By using the described balancing technique this inequality can at least be reduced.

As an alternative to determining an average slip ratio for each side of the aircraft, the brake control unit 108 could determine an average slip ratio for the aircraft by summing the individual slip ratios for all the wheels 100 and then dividing by eight. In this case, the brake control unit 108 would issue commands to the individual brake controllers 106 that would adjust the gain of the controllers to adjust the individual brake force applied by each brake unit 102 to the average. At present, the previously described method of determining an average of the two values is preferred as balancing the individual brake units against an aircraft average is considered more difficult to implement.

The braking control methods described in connection with FIGS. 2 and 3 each apply the balancing techniques in braking under control of an auto-brake system. The techniques may be applied equally to UAVs and manned aircraft. The techniques can also provide benefits if employed during a pilot controlled landing (ie in which the pilot controls the applied braking force using brake pedals instead of using an auto-brake). By automatically balancing the energy absorbed by the brake units, the work required from the pilot to balance the braking force applied, to the two sides of the aircraft is not needed, or is at least reduced.

It will be understood, that having the wheel radii calculated by the brake controller, it is possible to achieve much more accurate control of the aircraft brake system. If a stored fixed value were used, the results obtained would be less accurate, since while in use, the diameters of the wheels may change due to changes in tyre pressure, wear and changes in temperature.

While the invention has been described in detail and with reference to specific embodiments thereof, it will be apparent to one skilled in the art that various changes and modifications can be made therein without departing from the spirit and scope thereof.

The invention claimed is:

1. Apparatus for controlling an aircraft braking system that comprises at least one first side braking means for braking a wheel positioned on a first side of a longitudinal axis of an aircraft and at least one second side braking means for braking a wheel positioned on a second side of the longitudinal axis, said apparatus comprising control means for processing respective indications of braking effect of the braking means and in response to the result of said processing issuing control signals for controlling braking forces applied by the braking means, said indications of braking effect being determined based on wheel speed of the respective wheel and an aircraft speed value obtained without reference to wheel speed, each indication of braking effect comprising a brake slip ratio calculated using the equation:

$$\text{brake slip ratio} = \frac{\text{aircraft speed} - \text{wheel speed}}{\text{aircraft speed}}$$

said control signals being calculated to equalize said brake slip ratios, thereby to cause the braking force applied on said first side of the longitudinal axis by said at least one first side braking means to balance the braking force applied on the second side of the longitudinal axis by said at least one second side braking means.

2. Apparatus as claimed in claim 1, wherein said control means is configured to process respective slip ratios of a plurality of first side braking means to determine a first side average slip ratio value, to process respective slip ratios of a plurality of second side braking means to determine a second side average slip ratio value and to process said average slip ratio values to determine a target slip ratio value that is an average of said average slip ratio values, said control signals being calculated to cause said first side braking means to provide a first side average slip ratio value at least substantially equal to said target slip ratio value and said second side braking means to provide a second side average slip ratio value at least substantially equal to said target slip ratio value.

3. Apparatus as claimed in claim 2, wherein said control means is configured to compare the respective slip ratios of said first side braking means with said target slip ratio value and provide respective command signals for causing the respective braking forces applied by said first side braking means to be adjusted towards said target slip ratio value while maintaining a first side average slip ratio value at least substantially equal to said target slip ratio value and to compare the respective slip ratios of said second side braking means with said target slip ratio value and provide respective control signals for causing the respective braking forces applied by said second side braking means to be adjusted towards said target slip ratio value while maintaining a second side average slip ratio value at least substantially equal to said target slip ratio value.

4. Apparatus as claimed in claim 1, wherein said control means determines a target slip ratio value that is an average of the respective slip ratios of the first and second side braking means and said control signals are for causing each said braking means to apply a braking force that provides a slip ratio corresponding to said target slip ratio.

5. Apparatus as claimed in claim 1, wherein said wheel speed is determined by multiplying a sensed value of wheel speed by a wheel radius value.

6. Apparatus as claimed in claim 5, wherein said wheel radius value is a respective calculated value for each wheel.

7. Apparatus as claimed in claim 6, wherein the control means calculates said wheel radius value by dividing an aircraft speed value by a said sensed value of rotational wheel speed for the respective wheel.

8. Apparatus as claimed in claim 7, wherein said control means calculates said wheel radius value by dividing successive aircraft speed values by corresponding sensed values of rotational wheel speed for the respective wheel to obtain successive instant wheel radius values and averaging said successive instant wheel radius values.

9. Apparatus as claimed in claim 1, further comprising speed sensor means for sensing rotational wheel speed of the wheels and sending respective signals indicative of the wheel speeds to said control means.

10. Apparatus as claimed in claim 1, wherein said control means is configured to instigate braking on landing and provide signals for causing said braking means to apply braking forces that cause a required rate of deceleration of the wheels.

11. Apparatus as claimed in claim 1, further comprising respective brake control means for said at least one first side braking means and said at least one second side braking means, the control means issuing said control signals to the brake control means.

12. Apparatus as claimed in claim 1, wherein said control means is an aircraft systems control means for controlling aircraft systems additional to the braking means.

13. An apparatus as claimed in claim 1, wherein each said braking means comprises carbon-carbon friction surfaces.

14. An apparatus as claimed in claim 1, further comprising an auto-brake system for providing command signals for controlling the rate of deceleration of the vehicle during braking.

15. An aircraft fitted with apparatus as claimed in claim 1.

16. An aircraft as claimed in claim 15, which is an unmanned air vehicle.

17. A method of controlling brakes on an aircraft having at least one first side braking unit for braking a respective wheel positioned on a first side of a longitudinal axis of an aircraft and at least one second side braking unit for braking a respective wheel positioned on a second side of the longitudinal axis, said method comprising processing respective measurements of performance of the braking units which are calculated using a wheel rotational speed for the respective wheel and an indication of aircraft speed obtained without reference to the wheel speed, the respective measurements of performance are a slip ratio being calculated using the equation:

$$\text{brake slip ratio} = \frac{\text{aircraft speed} - \text{wheel speed}}{\text{aircraft speed}}$$

and, according to a processing output, issuing command signals for controlling the respective braking forces applied by the braking units calculated to equalize said brake slip ratios, thereby to obtain a force balance between the braking forces applied on the first side of the longitudinal axis by the at least one first side braking unit and the force applied on the second side of the longitudinal axis by the at least one second side braking unit.

18. A method as claimed in claim 17, wherein there is a plurality of said first side braking units and a plurality of said second side braking units, comprising processing the respective slip ratios of the first side braking units to derive a first side average slip ratio value, processing the respective slip ratios of the second side braking units to derive a second side average slip ratio value and determining a target slip ratio value as an average of said first side average slip ratio value and said second side average slip ratio value, said command signals being arranged to cause the respective braking forces applied by the braking units to be adjusted such that the first side average slip ratio value and the second side average slip ratio value each tend towards said target slip ratio value.

19. A method as claimed in claim 18, further comprising comparing the respective slip ratios of said first side braking units with said target slip ratio value and issuing respective command signals for causing the respective braking forces applied by said first side braking units to tend towards said target slip ratio value while maintaining a first side average slip ratio value at least substantially equal to said target slip ratio value and comparing the respective slip ratios of said second side braking units with said target slip ratio value and issuing respective command signals for causing the respective braking forces applied by said second side braking units to tend towards said target slip ratio value while maintaining a second side average slip ratio value at least substantially equal to said target slip ratio value.

20. A method as claimed in claim 19, comprising determining an average value of the slip ratios of the first side and second side braking units, said command signals being arranged to cause the respective braking forces applied by the braking units to tend towards said average value.

21. A method as claimed in claim 20, comprising comparing said average value with a required braking performance value corresponding to a braking force required to provide a required deceleration for the aircraft, said commands being arranged to cause the respective braking forces by the braking units to be adjusted such that said average value at least substantially equals the required braking performance value.

22. A method as claimed in claim 17, wherein said wheel speed is calculated by multiplying a sensed value of wheel rotational speed by a wheel radius value.

23. A method as claimed in claim 22, wherein said wheel radius value is a calculated value for the respective wheel.

24. A method as claimed in claim 23, wherein said wheel radius value is calculated by dividing an indication of aircraft speed by a sensed value of rotational speed of the respective wheel.

25. A method as claimed in claim 24, wherein the wheel radius value is calculated by dividing successive indications of aircraft speed by corresponding sensed values of rotational speed of the respective wheel to obtain successive instant wheel radius values and obtaining an average of said instant wheel radius values.

26. A method as claimed in claim 17, wherein the aircraft is an unmanned air vehicle.

27. A non-transitory computer program product comprising one or more computer program software portions that in an execution environment are configured to implement the method of claim 17.

28. A non-transitory data storage medium having at least one of said computer program software portions of claim 27 stored thereon.

29. A non-transitory microcomputer device provided with said non-transitory data storage medium as claimed in claim 28.

* * * * *